Feb. 6, 1940.  A. GUINEZ  2,189,245
MEASURING INSTRUMENT
Filed May 3, 1937
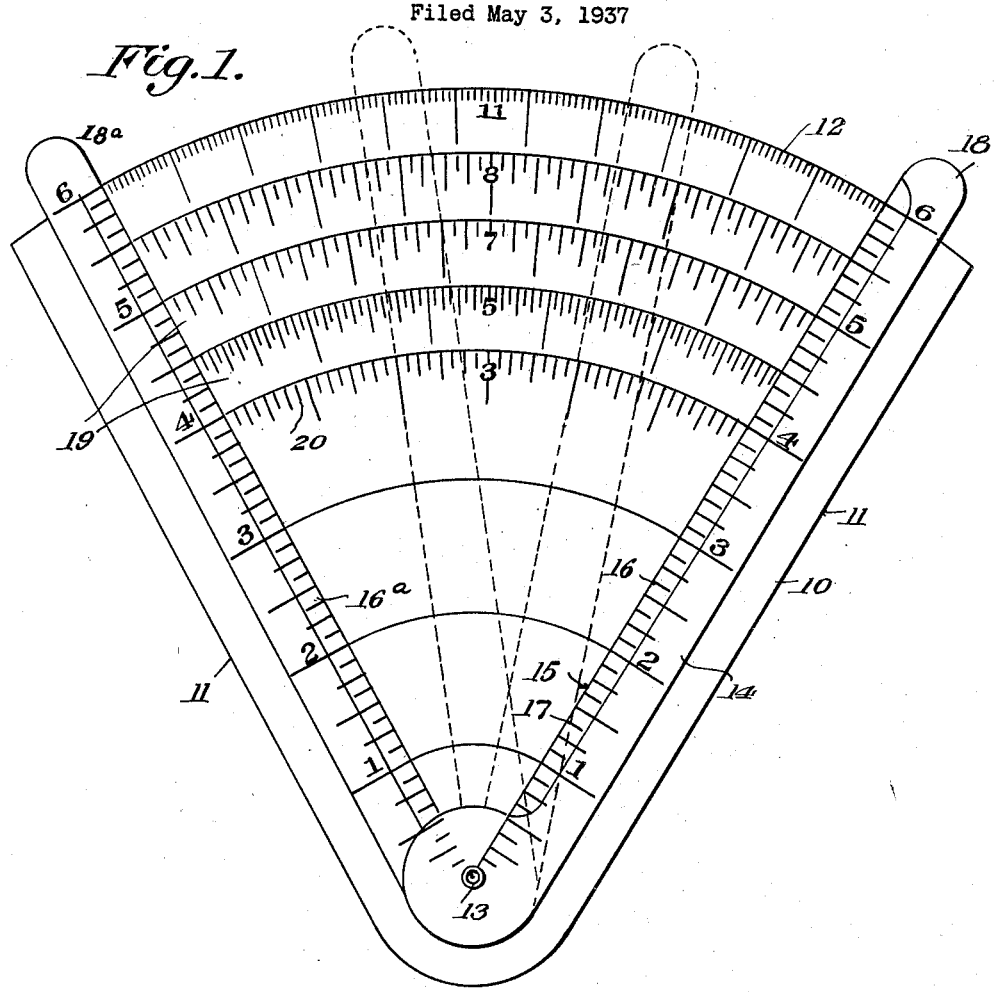
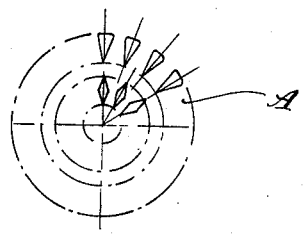
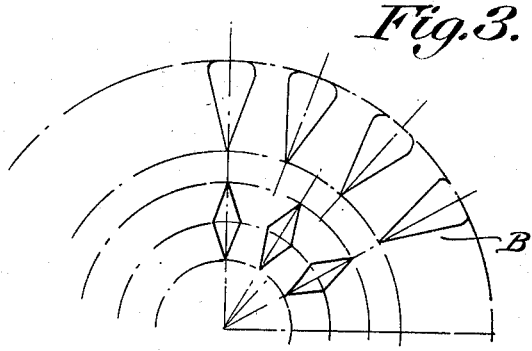
Antonio Guinez
INVENTOR
BY Victor J. Evans & Co.
ATTORNEYS Patented Feb. 6, 1940

2,189,245

UNITED STATES PATENT OFFICE 2,189,245

MEASURING INSTRUMENT

Antonio Guinez, New York, N. Y., assignor of one-tenth to Calogero Badalamente, New York, N. Y.

Application May 3, 1937, Serial No. 140,526

1 Claim. (Cl. 33—75)

The invention relates to a drafting instrument and more especially to a measuring device for varying uses.

The primary object of the invention is the provision of an instrument or device of this character, wherein through the use thereof varying character work can be laid out with accuracy and design and measurement as, for example, a pointed star, a segment of a circle, chords, and, in fact, many symmetrical configurations, the laying out of the work being had with dispatch and without the employment of other measuring appliances as commonly employed in drafting.

A further object of the invention is the provision of an instrument or device of this character, which may be used as a straight rule, a triangle and a protractor and more especially as a measurer for circles and the dividing of the circles in determined portions for the mapping and patterning of configurations and the like.

A still further object of the invention is the provision of an instrument or device of this character, which is extremely simple in construction, thoroughly reliable and efficient in its operation, light in weight, enabling the easy handling thereof, yet strong, durable, and inexpensive to manufacture.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing:

Figure 1 is a plan view of a measuring instrument or device constructed in accordance with the invention.

Figure 2 is a diagrammatic plan view showing a specimen of a layout of a piece of work effected by the instrument in the use thereof.

Figure 3 is a view similar to Figure 2 showing an enlargement thereof.

Similar reference characters indicate corresponding parts throughout the several views in the drawing.

Referring to the drawing in detail, the instrument or device comprises a segmental shaped body 10 preferably made flat and formed from a blank of sheet metal having the required thickness and in its size is one-sixth of a circle. The body 10 is formed with the angled straight opposite side edges 11 converging toward the center of the circle matching the one-sixth size thereof of the said body 10 while the outer arched edge 12 of this body coincides with the perimeter of the said circle.

Swingingly fitted with the body 10 on a center axis 13 is a shiftable arm or blade 14 having the beveled inner straight edge 15 and this arm or blade 14 has provided on the exposed surface or face thereof the graduated lineal inch scale 16 and the fractional division markings 17 to each inch graduation. The arm or blade 14 at its outer end opposite the pivotal end of the same is extended at 18 to provide a finger engaging portion or terminal disposed beyond the arched edge 12 of the body 10 so that this arm or blade 14 can be manually moved for swing upon the pivot 13 which is made fast in the body 10 at the true center thereof.

The outer or top face of the body is provided with a series of arcuate scales 19 uniformly spaced. These scales are respectively divided into three, five, seven, eight and eleven divisions, the divisions on each scale being sub-divided as at 20. Thus the scales provide for angular divisions of sixty degrees into three, five, seven, eight and eleven parts and the sub-divisions provide for further sub-dividing these. Aside from the scales 19, the face is provided with a scale 16a corresponding to the scale on the arm of the blade 15 and the body is formed with an extension 18a of which the inner edge is a continuation of the calibrated edge of the scale 16a.

In the use of the invention, construction circles, such as are indicated in dot and dash lines in Figures 2 and 3, are inscribed around a fixed point. Over this is placed the instrument with the axis member 13 coincident with the point of generation of the construction circles. Any one of the scales 19 may be selected, depending on the number of divisions to be made in the construction circles. For example, if there are to be four divisions in a sixty degree segment, as indicated in Figures 2 and 3, the eight-scale is selected and the radial construction lines marked off by making the first at the inner edge of the extension 18a, the next at the inner edge of the blade 18 when the latter is on the second division of the eight-scale, considering the scale 16a as the starting position. The remaining points are marked off at the fourth division, sixth division and eighth division.

If the sixty degree segment is to be divided into eleven, or seven, or five, or three divisions, or multiples thereof, the necessary points on the scales are selected for the positioning of the blade 15.

It is not necessary that the construction arcs correspond in radius with the radius of the body of the instrument, because it is being used to effect angular divisions and the selected points in the center are sufficient to determine the construction points on the construction lines.

The divisions on the scale 16a are merely for convenient reference but the divisions 17 on the blade may be used by swinging the blade off of the body and using it to divide a straight line.

It will be noted, that the scales 19, while uniformly divided, have a number of general divisions in each prime to the number of general divisions in each other.

What is claimed is:

An instrument of the kind indicated comprising a generally triangular flat body having one arcuate edge and an inscribed area equal to the segment of a circle whose periphery is co-incident with the arcuate edge, and a straight blade having a pivotal mounting at the point constituting the center from which the arcuate edge is generated, the inscribed area being formed with a series of uniformly spaced arcs which are uniformly divided throughout their lengths with the number of divisions in each prime to the number of divisions in every other arc, the extremity of the blade extending beyond the arcuate edge, and the body being formed with an extension at the arcuate edge at one side of the inscribed area.

ANTONIO GUINEZ.